April 19, 1966  G. J. SHUGARS  3,246,545
WORKING TOOL
Filed May 13, 1964
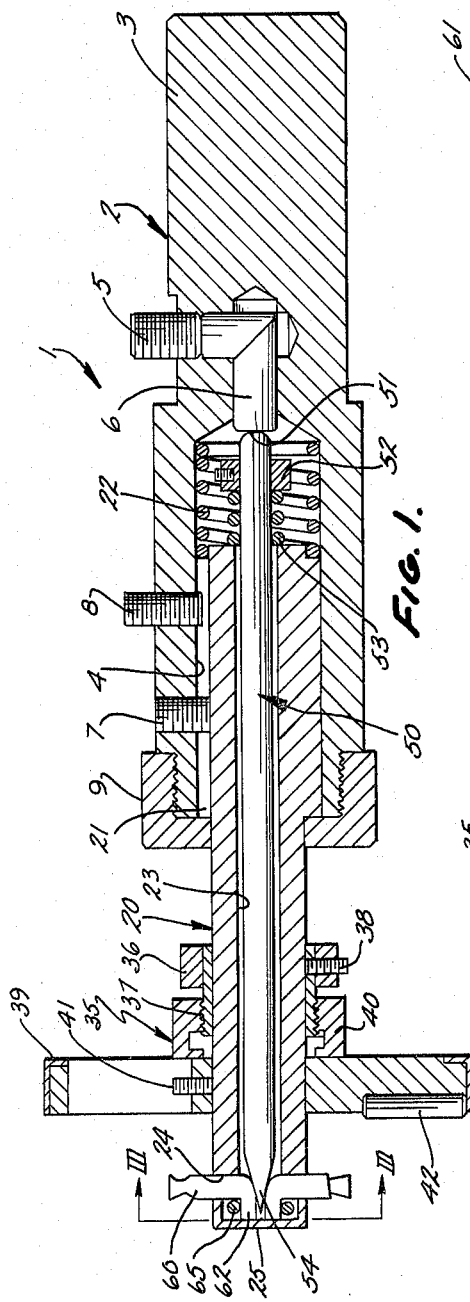
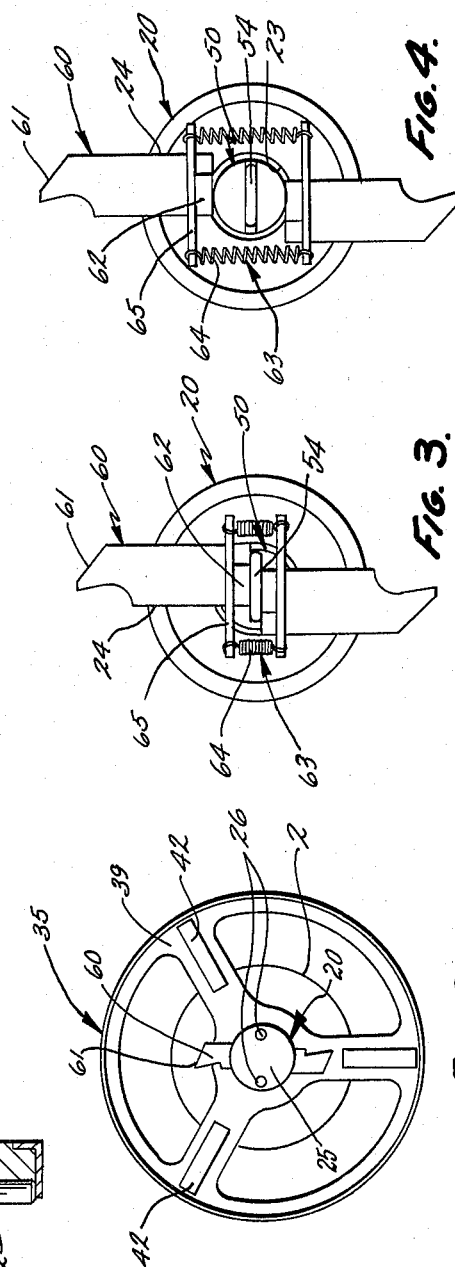
INVENTOR.
GERALD J. SHUGARS
BY
ATTORNEYS 3,246,545
WORKING TOOL
Gerald J. Shugars, 771 Wood St., Muskegon, Mich.
Filed May 13, 1964, Ser. No. 367,020
14 Claims. (Cl. 77—58)

This invention relates to a working tool. More particularly, this invention relates to an automatic internal grooving or reaming tool.

Tools presently designed for these purposes often jam within the workpiece, bending or distorting the cutting tools. Additionally, this makes cutting and reaming a rather delicate operation, and a difficult and frustrating operation when jamming occurs. It is an object of this invention to provide an improved automatic working tool of this general nature.

A further object of this invention is to provide such a structure which utilizes a floating cam rod between the butt ends of cutting or reaming tools, this floating principle permitting the cutting or reaming tools to seek and find equalized pressures at all times during the working processes.

A further object of this invention is the provision of such a structure which permits it to be used as either a floating reamer or an automatic internal grooving tool.

An additional object of this invention is the provision of such a structure having working elements which are activated by force applied from within the tool itself, providing greater speed and accuracy in the working processes.

A still further object of this invention is to provide such a structure which enables its operator to make substantial savings in time and expense, the tool being easier and more efficient in operation than such tools presently in existence.

These and other objects of this invention will become apparent to those skilled in the relevant arts upon reading the following specification in conjunction with the accompanying drawings, wherein:

FIG. 1 is an enlarged cross-sectional view of an automatic working tool embodying the principles of this invention;

FIG. 2 is an end view of the tool shown in FIG. 1, viewed from the left-hand side;

FIG. 3 is a cross-sectional view taken along the plane III—III of FIG. 1; and

FIG. 4 is a view similar to FIG. 3, the working elements being extended from the tool.

Briefly, this invention relates to an automatic internal working tool having a housing. An elongated hollow tool bar is slidably mounted in the housing, the tool bar having one end extending axially from the housing. Working elements are mounted adjacent one end of the tool bar, the elements movable with respect to the tool bar in a direction outwardly from the axis thereof. Means normally biasing the working elements toward the axis of the tool bar are provided, together with a cam rod slidably mounted within the tool bar and abutted within the housing. The cam rod is tapered at one end thereof and positioned to pass between the working elements upon relative movement of the tool bar and the housing, thereby moving the working elements outwardly to a working position.

Referring more specifically to the drawing, the reference numeral 1 designates the tool embodying the teachings of this invention (FIG. 1). The tool 1 includes a housing 2, a tool bar 20, a thrust wheel assembly 35, a cam rod 50 and working elements or cutting tool 60.

In the embodiment shown, the housing 2 is generally cylindrical including a shank portion 3 which in some cases may be adapted to be rotated by powered means. In most instances however, the work itself is rotated with respect to the tool. The interior of the housing 2 is hollowed at 4 for reception of the tool bar 20. Threaded element 5 extends into the housing 2, engaging the stop 6 at right angles thereto. It will be seen that turning of the threaded element 5 moves it inwardly and outwardly of the housing 2, thereby moving the stop 6 axially of the housing 2, the purpose of which will be explained hereinafter. A threaded key 7 and a threaded tool bar lock screw 8 extend into the housing 2 and into the hollow interior 4 thereof. The tool bar 20 slidably extends into the hollow interior 4 of the housing 2, the key 7 slidably seating in the groove 21 provided on the tool bar. The cap 9 threads on the housing 2, completing the assembly of the tool bar with respect to the housing.

As noted, the tool bar 20 is slidably movable with respect to the housing 2. A coil spring 22 seats in the interior 4 of the housing 2, normally biasing the tool bar axially outwardly thereof. The tool bar 20 is hollowed to form the cavity 23 along its length for reception of the cam rod 50. Openings 24 slidably accommodate the cutting tools 60, and a cap 25 is held on by screws 26 (FIG. 2) closing the tool bar.

The thrust wheel assembly 35 is slidably mounted on the end of the tool bar 20 extending from the housing 2. The thrust wheel assembly 35 includes a collar 36 having a threaded portion 37, the collar 36 affixed to the tool bar 20 by means of the lock screw 38 (FIG. 1). The thrust wheel 39 includes a threaded collar 40 adapted to be screwed on the threaded portion 37 of the collar 36. A lock screw 41 is adapted to prevent rotation of the thrust wheel 39 with respect to the tool bar 20. A plurality of rollers 42 are associated with the face of the thrust wheel 39.

Mounted within the tool bar 20 is a floating cam rod 50. It will be seen that the diameter of the cam rod 50 is less than that of the cavity 23 within the tool bar 20, the purpose of which will be more fully explained hereinafter. The end 51 of the cam rod abuts against the adjustable stop 6 within the housing 2. A spring stop 52 is provided adjacent the end 51 of the cam rod, the spring 53 being provided to be compressed between the end of the tool bar 20 and the spring stop 52, thus biasing the cam rod 50 toward the adjustable stop 6 in the housing 2. The end 54 of the cam rod 50 is tapered, the purpose of which will be more fully explained hereinafter.

The cutting tools 60 extend from the tool bar 20, including cutting edges 61 and interior shoulders 62. As best shown in FIGS. 3 and 4, the spring assembly 63 envelops the shoulder 62, the springs 64 within the assembly 63 biasing the cutting tools 60 toward the axis of the tool bar 20 through the retaining elements 65. It will now be seen that the tapered end 54 of the cam rod 50 is positioned for movement between the shoulders 62 of the cutting tools 60, forcing the cutting tools inwardly or outwardly of the tool bar 20, dependent on the distance which the tapered end extends between the cutting tools.

Assembly and operation

The working tool is assembled as follows. The tool bar 20 is inserted into the hollow interior 4 of the housing 2, the cam rod 50 positioned within the hollow cavity 23 of the tool bar 20. The end 51 of the cam rod 50 abuts the stop 6 in the housing 2, the spring 53 positioned between the tool bar 20 and the spring stop 52, normally biasing the cam rod toward the stop 6. The spring 22 is positioned between the tool bar 20 and the housing 2, normally biasing the tool bar axially outwardly from the housing 2. The tool bar 20 is prevented from normal rotation with respect to the housing 2 by means of the key 7 slidably received in the groove 21. The cap 9 secures this assembly in position.

The thrust wheel assembly 35 is then slid on the end of the tool bar 20 extending from the housing 2. The assembly is positioned on the tool bar by means of the lock screw 38 affixing the collar 36 thereto. Additionally, the lock screw 41 prevents the collar 40 on the thrust wheel 39 from rotating with respect to the collar 36. The cutting tools 60 are positioned within the tool bar 20, the spring assembly 63 enveloping the shoulder 62 thereof, the entire assembly held in position by means of the cap 25.

To operate the tool 1 as an automatic internal grooving tool, it will be seen that insertion of the tool bar 20 within the hollow interior of a workpiece is possible since the cutting tools 60 are normally biased toward the axis of the tool bar through the spring assembly 63. However, when the thrust wheel 39 engages the workpiece, the tool bar 20 will be forced axially inwardly with respect to the housing 2, which in turn forces the tapered end 54 of the cam rod 50 between the cutting tools 60 since the cam rod is abutted against the stop 6 within the housing 2. This forces the cutting tools 60 outwardly with respect to the axis of the tool bar 20, the distance these tools move outwardly being dependent upon the extent to which the tapered end 54 moves between the cutting tools. To determine the internal distance at which a groove will be cut within a workpiece, the thrust wheel assembly is set as follows. Upon loosening of the lock screws 38 and 41, the collar 36 may be slid along the tool bar 20. A rough setting is made by tightening lock screw 38, which affixes collar 36 to the tool bar 20. A fine adjustment is then made by rotating the collar 40 with respect to the collar 36, and tightening lock screw 41 to prevent rotation of the thrust wheel 39 with respect to the collar 36. When thus finely and very accurately set, insertion of the tool bar 20 into the workpiece actuates the cutting tool 60 when the rollers 42 of the thrust wheel assembly engage the workpiece.

The depth of the internal groove cut is determined as follows. After a rough depth has been ascertained by use of conventional machine or lathe stops associated with the device, a fine adjustment is obtained by rotation of the threaded element 5 into or out of the housing 2. This respectively moves the stop 6 toward or away from the cam rod 50. This in turn determines the exact extent to which the tapered end 54 of the cam rod 50 extends between the shoulder 62 of the cutting tools 60, thereby determining the distance to which the cutting tools extend from the axis passing through the tool bar. In this manner, the depth of the groove to be cut is very accurately determined.

When thus set, it will be seen that as the cutting ends 61 of the cutting tools 60 operate upon the workpiece, the forces applied cause the cutting tools to seek and find equalized pressures with respect to each other. This is because cam rod 50 floats within the tool bar 20. This unique feature assures much greater accuracy in the machining operation and assures substantial savings in time and expense since jamming is virtually eliminated. At all times during the operation of the tool, the sides of the floating cam rod are spaced from the walls of the cavity within the tool bar. The user is assured that this floating principle permits the cutting tools to find their own equalized pressure at all times so that the pressure of the tool may force the floating cam rod toward one wall or the other of the tool bar which more closely facilitates the desired equalized pressure of the opposed cutting tools. At this point it should be noted that a plurality of cutting tools may be used, the tapered end 54 being then conical instead of beveled. After the cut has been made within the workpiece, the tension of the tool against the workpiece is released, permitting the tool bar 20 to slide axially outwardly from the housing 2, causing the floating cam rod 50 to be withdrawn within the housing 2 and from between the cutting tools 60, the cutting tools thereby moving back toward the axis of the tool bar through the spring assembly 63.

It should also be noted that the tool 1 may be used as an automatic internal reaming device. For the accomplishment of this use, the thrust wheel assembly 35 is preferably disengaged from the tool bar 20. The tool bar 20 is then slide into the housing 2 until the approximate size of the inside diameter to be reamed is determined. The lock screw 8 then affixes the tool bar 20 in this position. After such a rough setting has been made, micrometers may be used across the ends of the working tools for exact measurement, and the tools may then be extended or retracted to the exact desired measurement by turning the threaded element 5 either inwardly or outwardly. After this precise setting has been made, the device is moved into the internal surface to be reamed.

It will now be seen that this invention has provided a working tool of exceptional simplicity in structure, since precise exact machining of the parts has been eliminated through the floating cam principle described. Additionally, the structure is simpler to operate, yet is much more accurate in either internal grooving or reaming operations. Since the working tools seek and find equalized pressure, the operation of the device is vastly improvide, both with respect to functioning and with respect to results obtained.

While only one emobdiment of this invention has been shown and described, it may be possible to practice this invention through the utilization of other embodiments without departing from the spirit and scope thereof. Such other embodiments are to be included as part of this invention unless the following claims specifically state otherwise.

I claim:

1. An automatic internal working tool, comprising: a housing; an elongated hollow tool bar slidably mounted in said housing, said tool bar having one end extending axially from said housing; working elements mounted adjacent said end of said tool bar, said elements movable with respect to said tool bar in a direction outwardly from the axis thereof; means normally biasing said working elements toward said axis of said tool bar; a cam rod slidably mounted within said tool bar and abutted within said housing; said cam rod having a diameter less than the diameter of the interior of said hollow tool bar, said cam rod floating therein; and said cam rod tapered at one end thereof, positioned to pass between said working elements upon relative movement of said tool bar and said housing, thereby moving said working elements outwardly to a working position.

2. An automatic internal working tool, comprising: a housing; an elongated hollow tool bar slidably mounted in said housing, said tool bar having one end extending axially from said housing; said tool bar normally biased in a direction outwardly form said housing; working elements mounted adjacent said end of said tool bar, said elements movable with respect to said tool bar in a direction outwardly from the axis thereof; means normally biasing said working elements toward said axis of said tool bar; a cam rod slidably mounted within said tool bar and abutted within said housing; said cam rod having a diameter less than the diameter of the interior of said hollow tool bar, said cam rod floating therein; and said cam rod tapered at one end thereof, positioned to pass between said working elements upon relative movement of said tool bar and said housing, thereby moving said working elements outwardly to a working position.

3. An automatic internal working tool as defined in claim 2, said means normally biasing said working elements toward said axis of said tool bar comprising springs interconnecting the ends of said working elements within said tool bar.

4. An automtaic internal working tool, comprising: a housing; an elongated hollow tool bar slidably mounted in said housing, said tool bar having one end extending axially from said housing; said tool bar normally biased in a direction outwardly from said housing; working elements mounted adjacent said end of said tool bar, said elements slidably movable with respect to said tool bar in a direction outwardly from the axis thereof; means normally biasing said working elements toward said axis of said tool bar; a thrust wheel mounted on said tool bar fro bearing against the work; a cam rod slidably mounted within said tool bar and abutted within said housing; said cam rod having a diameter less than the diameter of the interior of said hollow tool bar, said cam rod floating therein; and said cam rod tapered at one end thereof, positioned to pass between said working elements upon sliding movement of said tool bar into said housing when said thrust wheel engages the work, thereby moving said working elements outwardly to a working position.

5. An automatic internal working tool as defined in claim 4, said means normally biasing said working elements toward said axis of said tool bar comprising springs interconnecting the ends of said working elements within said tool bar.

6. An automatic internal working tool, comprising: a housing; an elongated hollow tool bar slidably mounted in said housing, said tool bar having one end extending axially from said housing; said tool bar normally biased in a direction outwardly from said housing; working elements mounted adjacent said end of said tool bar, said elements slidably movable with respect to said tool bar in a direction outwardly from the axis thereof; means normally biasing said working elements toward said axis of said tool bar; a thrust wheel mounted on said tool bar for bearing against the work, said thrust wheel secured to a collar slidable on said tool bar, said collar rigidly securable thereon; a cam rod slidably mounted within said tool bar and abutted within said housing; and said cam rod tapered at one end thereof, positioned to pass between said working elements upon sliding movement of said tool bar into said housing when said thrust wheel engages the work, thereby moving said working elements outwardly to a working position.

7. An automatic internal working tool as defined in claim 6, said thrust wheel threadably secured to said collar and including additional means for stabilization with respect to said tool bar.

8. An automatic internal working tool, comprising: a housing; an elongated hollow tool bar slidably keyed within said housing, said tool bar having one end extending axially from said housing; said tool bar normally biased in a direction outwardly from said housing; working elements mounted adjacent said end of said tool bar, said elements slidably movable with respect to said tool bar in a direction generally perpendicular to the axis thereof; spring means normally biasing the ends of said working elements within said tool bar toward said axis of said tool bar; a thrust wheel fixedly mounted on said tool bar for bearing against the work, said thrust wheel secured to a collar slidable on said tool bar, said collar rigidly securable thereon; a cam rod slidably mounted within said tool bar and biased toward abutment within said housing; means in said housing for adjusting the position of abutment of said cam rod in said housing; said cam rod having a diameter less than the diameter of the interior of said hollow tool bar, said cam rod floating therein; said cam rod tapered at one end thereof, positioned to pass between said working elements upon sliding movement of said tool bar into said housing when said thrust wheel engages the work, and thereby moving said working elements outwardly to a working position.

9. An automatic internal working tool as defined in claim 8, said thrust wheel threadably secured to said collar and including additional means for stabilization with respect to said tool bar.

10. An automatic internal working tool as defined in claim 8, including a locking means in said housing for preventing movement of said tool bar with respect to said housing.

11. An automatic internal working tool, comprising: a housing; an elongated hollow tool bar associated with said housing; working elements mounted in said tool bar, said elements movable with respect to said tool bar in a direction outwardly from the axis thereof; means normally biasing said working elements toward said axis of said tool bar; a cam rod slidably mounted within said tool bar and abutted within said housing; said cam rod having a diameter less than the diameter of the interior of said hollow tool bar, said cam rod floating therein; and said cam rod tapered at one end thereof, positioned to pass between said working elements for determining the distance said elements extend outwardly from said tool bar.

12. An automatic internal working tool, comprising: a housing; working elements associated with said housing, said elements movable with respect to said housing in a direction outwardly from the axis thereof; means normally biasing said working elements toward said axis of said housing; a cam member movably mounted within said housing and abutted within said housing, said cam member floating within said housing; and said cam member tapered at one end thereof, positioned to pass between said working elements for determining the distance said elements extend outwardly from said axis.

13. An automatic internal working tool, comprising: a housing; an elongated hollow tool bar slidably mounted in said housing, said tool bar having one end extending axially from said housing; said housing including a locking means for preventing movement of said tool bar with respect to said housing; said tool bar normally biased in a direction outwardly from said housing; working elements mounted adjacent said end of said tool bar, said elements slidably movable with respect to said tool bar in a direction outwardly from the axis thereof; means normally biasing said working elements toward said axis of said tool bar; a thrust wheel mounted on said tool bar for bearing against the work; a cam rod slidably mounted within said tool bar and abutted within said housing; and said cam rod tapered at one end thereof, positioned to pass between said working elements upon sliding movement of said tool bar into said housing when said thrust wheel engages the work, thereby moving said working elements outwardly to a working position.

14. An automatic internal working tool, comprising: a housing; an elongated hollow tool bar slidably mounted in said housing, said tool bar having one end extending axially from said housing; said tool bar normally biased in a direction outwardly from said housing; working elements mounted adjacent said end of said tool bar, said elements slidably movable with respect to said tool bar in a direction outwardly from the axis thereof; means normally biasing said working elements toward said axis of said tool bar; a thrust wheel mounted on said tool bar for bearing against the work; a cam rod slidably mounted within said tool bar and abutted within said housing; means in said housing for adjusting the position of abutment of said cam rod within said housing; and said cam rod tapered at one end thereof, positioned to pass between said working elements upon sliding movement of said tool bar into said housing when said thrust wheel engages the work, thereby moving said working elements outwardly to a working position.

References Cited by the Examiner

UNITED STATES PATENTS

| | | | |
|---|---|---|---|
| 941,845 | 11/1909 | Barnes | 77—75.5 |
| 1,362,529 | 12/1920 | Ehlers. | |
| 3,131,585 | 5/1964 | Vandersteeg | 77—58 |

FOREIGN PATENTS

| | | |
|---|---|---|
| 768,670 | 8/1934 | France. |
| 1,234,204 | 10/1960 | France. |

WILLIAM W. DYER, JR., *Primary Examiner.*